United States Patent
Zhang et al.

[19]

[11] Patent Number: 6,155,043
[45] Date of Patent: Dec. 5, 2000

[54] METHOD FOR INJECTION DURATION CORRECTION IN AN INTERNAL COMBUSTION ENGINE HAVING A SECONDARY-AIR SYSTEM

[75] Inventors: Hong Zhang; Frank Hacker, both of Regensburg, Germany

[73] Assignee: Siemens Aktiengesellschaft, Munich, Germany

[21] Appl. No.: 09/343,428

[22] Filed: Jun. 30, 1999

[30] Foreign Application Priority Data

Jun. 30, 1998 [DE] Germany .................. 198 29 205

[51] Int. Cl.$^7$ ...................................... F01N 3/00
[52] U.S. Cl. ................ 60/284; 60/285; 60/286; 60/304; 60/305
[58] Field of Search .............. 60/284, 285, 286, 60/304, 305

[56] References Cited

U.S. PATENT DOCUMENTS

| | | | |
|---|---|---|---|
| 4,363,209 | 12/1982 | Atago et al. | 60/285 |
| 5,319,928 | 6/1994 | Bone et al. | 60/284 |
| 5,442,911 | 8/1995 | Hirsch | 60/305 |
| 5,444,975 | 8/1995 | Gohre et al. | 60/284 |
| 5,566,547 | 10/1996 | Hosoya et al. | 60/284 |
| 5,617,720 | 4/1997 | Achleitner et al. | 60/284 |
| 5,675,968 | 10/1997 | Katashiba et al. | 60/284 |
| 5,765,368 | 6/1998 | Matsumoto et al. | 60/284 |
| 5,832,725 | 11/1998 | Sim | 60/305 |
| 5,992,143 | 11/1999 | Manaka et al. | 60/285 |
| 6,044,643 | 4/2000 | Ittner et al. | 60/285 |
| 6,050,086 | 4/2000 | Ishizuka et al. | 60/284 |

FOREIGN PATENT DOCUMENTS

| | | |
|---|---|---|
| 0469170A1 | 2/1992 | European Pat. Off. . |
| 19539938C2 | 12/1997 | Germany . |
| 356000519 | 1/1981 | Japan ................. 60/304 |
| 406212959 | 1/1981 | Japan ................. 60/284 |
| 0171016 | 10/1982 | Japan ................. 60/304 |

OTHER PUBLICATIONS

"Kraftfahr Technisches Taschenbuch" (pocket guide for the automotive industry), Bosch, 22$^{nd}$ edition, pp. 489–490.

*Primary Examiner*—Thomas Denion
*Assistant Examiner*—Diem Tran
*Attorney, Agent, or Firm*—Herbert L. Lerner; Laurence A. Greenberg; Werner H. Stemer

[57] ABSTRACT

By taking into account the deviation between a desired value, determined from a model for a secondary-air mass flow and an actual value of the secondary-air mass flow, detected by an airflow sensor, a correction value is obtained. From the correction value, together with a main-air mass flow that is present in an intake tract of the internal combustion engine and a pilot control value for an air/fuel ratio, a correction factor for correcting an injection duration is derived.

6 Claims, 3 Drawing Sheets

METHOD FOR INJECTION DURATION CORRECTION IN AN INTERNAL COMBUSTION ENGINE HAVING A SECONDARY-AIR SYSTEM

BACKGROUND OF THE INVENTION

Field of the Invention

The invention relates to a method for injection duration correction in an internal combustion engine having a secondary-air system blowing air into an exhaust track upstream of a catalyst. The injection duration is controlled or corrected in dependence on a main-air mass flow, the secondary air-mass flow and a pilot control value for an air/fuel ratio.

The pollutant emission of an internal combustion engine can be reduced effectively by catalytic after treatment with the aid of a three-way catalyst in conjunction with a lambda control device. An important precondition for this, however, is that, as well as the lambda probe of the control device, the catalyst, too, has reached its operating temperature. Below this temperature, approximately 300° C. in typical motor vehicle catalysts, the catalyst is ineffective to only slightly effective and the reaction takes place only at insufficiently low conversion rates (<10%). Various warm-up strategies are known in order to ensure that the light-off temperature is reached quickly and consequently to reduce pollutant emission during the cold-starting phase of the internal combustion engine when approximately 70 to 90% of all the HC and CO pollutants are emitted within the first 10–15 seconds.

Rapid heating of the catalyst may be carried out not only by retarding the ignition angle, raising the idling speed and making the mixture leaner, but also by enriching the mixture and at the same time blowing secondary air into the exhaust tract of the internal combustion engine. In this case, during warm-up, secondary air is blown downstream of the outlet valves of the internal combustion engine via a secondary-air pump. Since the catalyst is operated with an oxygen excess due to the secondary air blown into the exhaust gas, the catalyst has an oxidizing action, that is to say the chemical reaction is exothermic, with the result that the intrinsic heating up of the catalyst is accelerated (see in this respect, for example, Kraftfahrtechnisches Taschenbuch/Bosch [Automobile Manual/Bosch], 22nd edition, 1995, pages 489 and 490).

However, the feed rate of the secondary air supplied cannot be increased as desired, since, beyond a specific mass of blown-in secondary air, cooling is brought about, which counteracts the heating and thereby delays the heating. It is therefore necessary to vary the secondary-air mass and the injection, that is to say the air/fuel ratio $\lambda$ of the internal combustion engine, optimally as a function of the secondary air mass.

Published, European Patent Application EP 0 469 170 A1 discloses a method for heating an internal combustion engine during warm-up, in which the quantity of the secondary air blown in is adapted as quickly as possible according to the operating state, so that a stoichiometric ratio is obtained. For this purpose, the feed rate of the secondary-air pump is controlled according to the enrichment factor and the intake air mass of the internal combustion engine or the feed rate of the secondary-air pump is set according to the load of the internal combustion engine in association with a temperature correction, regulation being superposed on a pilot control of the feed rate of the secondary-air pump. The regulation serves for correcting the feed rate pilot control that may possibly be maladapted over the course of time. The output signal from a lambda probe disposed in the exhaust tract serves as an actual-value variable for the regulation.

SUMMARY OF THE INVENTION

It is accordingly an object of the invention to provide a method for injection duration correction in an internal combustion engine having a secondary-air system which overcomes the above-mentioned disadvantages of the prior art methods of this general type, by which an operation of heating a catalyst disposed in an exhaust tract of an internal combustion engine can be optimized in a simple way even during a load cycle of the internal combustion engine.

With the foregoing and other objects in view there is provided, in accordance with the invention, a method for injection duration correction in an internal combustion engine, which includes:

blowing secondary air into an exhaust tract upstream of a catalyst via a secondary-air system during a warm-up phase of an internal combustion engine;

detecting a main-air mass flow present in an intake tract of the internal combustion engine and a secondary-air mass flow provided by the secondary-air system;

carrying out an injection duration correction in dependence on the main-air mass flow, the secondary-air mass flow and a pilot control value for an air/fuel ratio;

deducing a presence of a transient mode of the internal combustion engine from values of the main-air mass flow;

correcting the secondary-air mass flow in the transient mode of the internal combustion engine, and calculating a deviation between a desired value, determined from a model for the secondary-air mass flow, and a detected actual value of the secondary-air mass flow; and determining a correction factor for the injection duration correction from a correction value for the secondary-air mass flow, the main-air mass flow and the pilot control value for the air/fuel ratio.

Proceeding from the known features of the prior art (Published, European Patent Application EP 0 469 170 A1), after the transient mode has been detected by taking into account the deviation between a desired value, determined from a model for the secondary-air mass flow and the actual value, detected by an airflow sensor of the secondary-air mass flow, a correction value is obtained, from which, together with the main-air mass flow prevailing at the intake tract of the internal combustion engine and the pilot control value for the air/fuel ratio, the correction factor for correcting the injection duration is derived. A corrected value for the secondary-air mass thus serves as a command variable for the injection duration correction, with the result that it becomes possible to take into account the dead time due to the fact that the main-air mass flow and the secondary-air mass flow are determined at different times. Rapid heating, along with an optimum mixture composition, can thereby be achieved.

Other features which are considered as characteristic for the invention are set forth in the appended claims.

Although the invention is illustrated and described herein as embodied in a method for injection duration correction in an internal combustion engine having a secondary-air system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
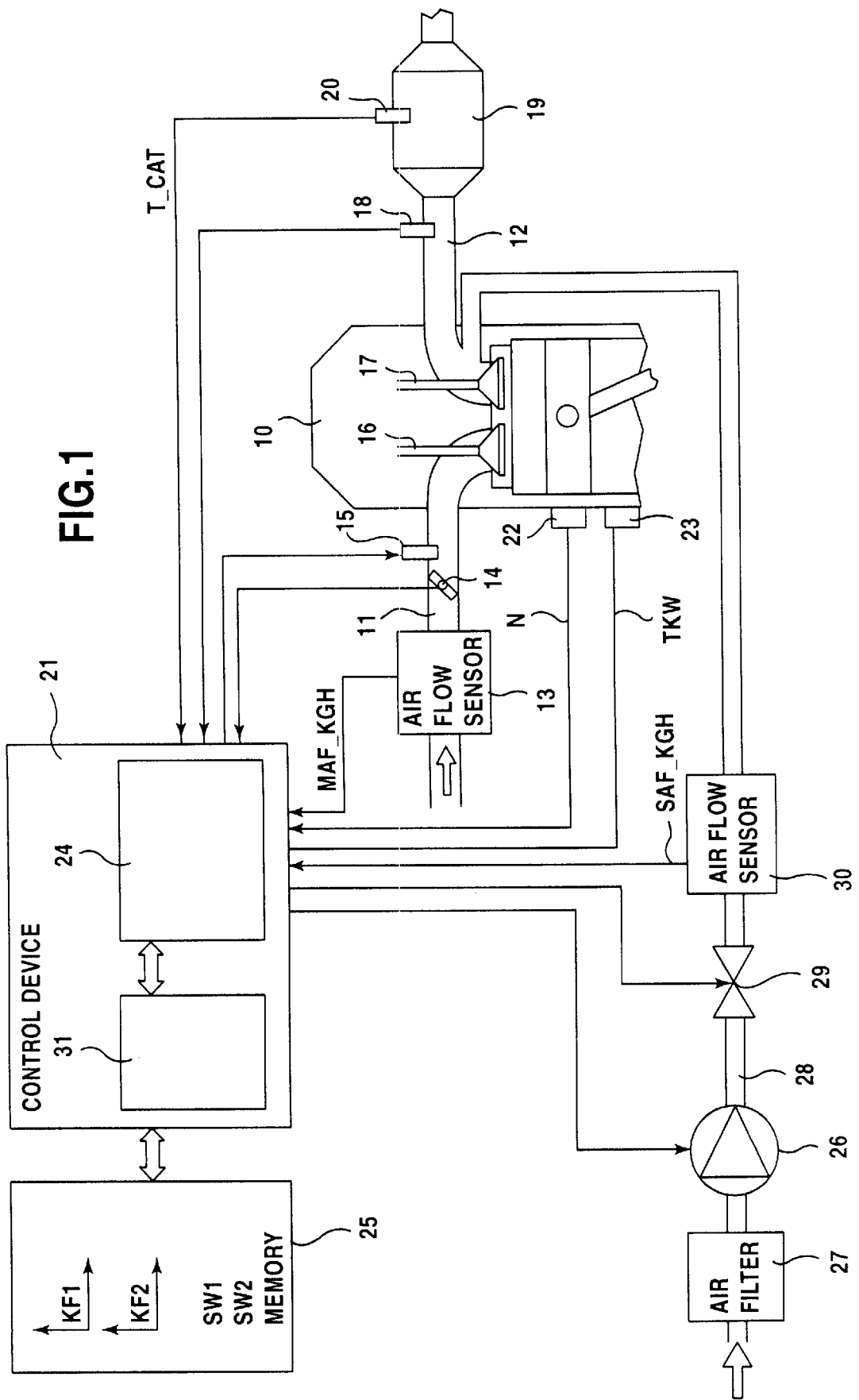
FIG. 1 is a diagrammatic, block diagram of an internal combustion engine with a secondary-air system according to the invention.

In all the figures of the drawing, sub-features and integral parts that correspond to one another bear the same reference symbol in each case. Referring now to the figures of the drawing in detail and first, particularly, to FIG. 1 thereof, there is shown an internal combustion engine 10 with a secondary-air system, illustrated in simplified form with only those parts necessary for understanding the invention.

The internal combustion engine 10 has associated with it an intake tract 11 connected thereto and an exhaust tract 12. Disposed in the intake tract 11 one after the other, as seen in the direction of flow of the intake air (arrow symbol), are an airflow sensor 13, a throttle valve 14, an injection valve 15 and an inlet valve 16 of a cylinder not shown in any more detail. The airflow sensor 13 measures the intake air mass of the internal combustion engine 10 and the throttle valve 14 serves for controlling the air flow. The exhaust gas passes via an outlet valve 17 into the exhaust tract 12, further along which are inserted a lambda probe 18 and a three-way catalyst 19 serving for converting the HC, CO and $NO_x$ constituents contained in the exhaust gas of the internal combustion engine 10. A temperature sensor 20 detects a temperature of the catalyst 19. The lambda probe 18 transmits an output signal to an electronic control device 21 of the internal combustion engine 10 as a function of the residual oxygen content in the exhaust gas and serves in the conventional way as a control element for a lambda control of the fuel/air mixture of the internal combustion engine 10.

Furthermore, other sensors for detecting operating parameters of the internal combustion engine 10 are provided at suitable locations on the internal combustion engine 10, in particular a rotational speed sensor 22 for detecting an engine rotational speed N and a temperature sensor 23 for detecting a coolant temperature TKW. The outputs of the sensors are connected via interfaces to corresponding inputs of the electronic control device 21.

Such electronic control devices for internal combustion engines, which, in addition to fuel injection and ignition, can also perform a multiplicity of other functions, inter alia also the control of exhaust-gas after treatment systems, are known per se, so that only the configuration and the operation thereof which relate to the present invention are dealt with below.

In order to control and regulate the internal combustion engine 10, the control device 21 is also connected to other sensors and actuators via data and control lines not illustrated in detail here. The control device 21 evaluates the sensor signals and controls or regulates, inter alia, the ignition and the injection, illustrated diagrammatically in FIG. 1 as block 24, as well as the supply of secondary air into the exhaust tract 12. Furthermore, another block 31, which evaluates the signal from the lambda probe 18 for the purpose of correcting the injection duration, is also illustrated as an essential part of the control device 21.

The electronic control device 21 has, in a known way, a microcomputer, corresponding interfaces for signal conditioning circuits and an input and output unit. The microcomputer contains a central processing unit (CPU) which executes the arithmetic and logic operations by the fed-in data. The programs and scheduled data necessary for this purpose are supplied by a read-only memory (ROM), in which all the program routines and all the characteristic data, characteristic curves, desired values, etc. are stored nonerasably. In particular, the control device 21 is connected to a memory 25 which stores, inter alia, a plurality of characteristic curves or characteristic maps and threshold values, the meanings of which, insofar as they are necessary for understanding the invention, are explained in more detail by the description of the following figures. An operating data memory (RAM) serves, inter alia, for storing the data supplied by the sensors, until the data are retrieved by the microcomputer or replaced, that is to say overwritten, by more current data. All the units mentioned are supplied with data, memory addresses and check signals via a bus.

In a so-called airflow-managed engine control, a fundamental injection duration or basic injection duration is calculated with the aid of the air-mass and rotational speed signals supplied by the sensors (the airflow sensor 13 and the rotational speed sensor 22) and conditioned in corresponding circuits and corrections of the basic injection duration are carried out as a function of further operating parameters, (for example, the pressure and temperature of the intake air, the temperature of the coolant, battery voltage, the residual oxygen content in the exhaust gas, etc.), in such a way that, in the control situation, a fuel/air mixture corresponding to the stoichiometric ratio ($\lambda=1.00$) is achieved by the use of the lambda control. When, with the aid of one or more injection valves 15, the fuel for the internal combustion engine 10 is injected, for the time span thus calculated, into the intake tract 11 or, alternatively, directly into the combustion chamber of the cylinders (direct injection).

A secondary-air pump 26 sucks in fresh air via an air line, not shown in any more detail, preferably having an air filter 27, and feeds the secondary air, as required, via a secondary-air line 28 to a location in the exhaust tract 12 which is directly downstream of the outlet valves 17.

The secondary-air pump 26 is an electrically driven pump which either can be controllable in terms of its feed rate or else has a fixed secondary-air feed rate. The secondary-air pump 26 is activated electrically via signals from the control device 21. It is also possible, however, for the secondary-air pump 26 to be driven mechanically by the internal combustion engine 10 itself, for example with a gearing being interposed.

Further disposed along the secondary-air line 28 is a secondary-air valve 29 acting as an electrically activatable ON/OFF valve. It is also possible, however, to use a valve, the opening cross section of which can be varied continuously via signals from the control device 21. Instead of an electrically activatable secondary-air valve 29, a valve may also be used which is actuated by the intake-pipe vacuum. Disposed downstream of the secondary-air valve 29 is an airflow sensor 30 that detects the secondary-air mass supplied to the exhaust tract and which transmits a corresponding signal SAF_KGH to the electronic control device 21.

Figure 2:
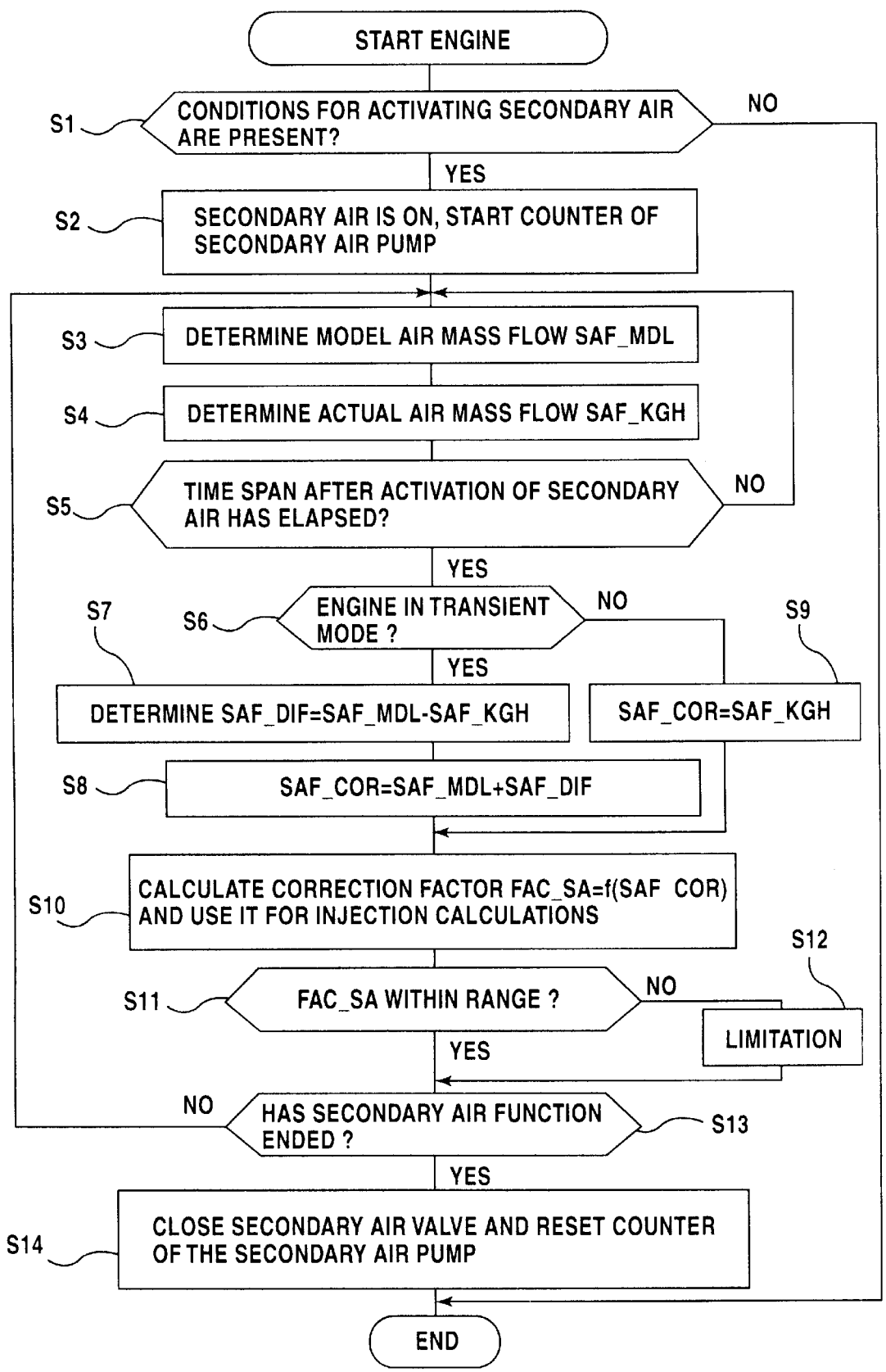
FIG. 2 is a flow chart for correcting an injection duration.

The flow chart according to FIG. 2 is used to explain how the injection duration is corrected by blowing in the secondary air.

After the internal combustion engine has started, a first method step S1 inquires whether particular conditions for activating the secondary-air function are satisfied. In particular, a check is made as to whether a predetermined time span (typically approximately 0.1 sec) has elapsed since the internal combustion engine 10 has started and there is no repeated starting.

If the conditions for activating the secondary-air function are not satisfied, there is a branch to the end of the method, otherwise the method continues with method step S2. The secondary-air valve 29 is opened and the secondary-air pump 26 switched on via corresponding signals from the control device 21. A time counter contained in the control device 21 is simultaneously started. Subsequently, in method step S3, a model variable, that is to say a theoretical variable, is determined for the secondary-air mass flow. For this purpose, a characteristic map KF1 is stored in the memory 25 of the control device 21, the characteristic map indicating the feed rate of the secondary-air pump 26, that is to say the secondary-air mass flow SAF_KGH, as a function of, for example, the supply voltage of the secondary-air pump, main-air mass flow, ambient pressure, ambient temperature and/or exhaust gas back pressure. In this case, the air mass flow prevailing in the intake tract 11 of the internal combustion engine 10 and detected by the airflow sensor 13 is designated as the main-air mass flow.

The exact makeup of such a feed characteristic map for the secondary-air pump is described, for example, in German Patent DE 195 39 938 C2 of the same applicant.

In method step S4, the actual secondary air mass flow SAF_KGH is determined. For this purpose, the signal from the airflow sensor 30 disposed in the secondary-air line 28 is detected and is intermediately stored in the memory 25. Subsequently, an inquiry is made (method step S5) as to whether a particular time span after the activation of the secondary-air function has already elapsed. For this purpose, the content of the counter started in method step S2 is compared with a threshold value SW1. The threshold value SW1, and therefore the time span, is dependent on the configuration of the secondary-air system, in particular the geometry (length and diameter) of the secondary-air line 28. It is necessary, specifically, to ensure that the complete system is filled with air and a defined secondary-air mass throughput has taken place.

If the inquiry is answered in the negative, that is to say the time span has not yet elapsed, there is a branch to method step S3, otherwise a check is made, in method step S6, as to whether the internal combustion engine is in the transient mode. For this purpose, the signal from the airflow sensor 13 disposed in the intake tract 11 of the internal combustion engine 10 is evaluated. The inquiry therefore serves for detecting a load jump. If the amount of the difference between two successive measurement values MAF_KGH(i−1), MAF_KGH(i) is greater than the predetermined threshold value SW2, then the difference SAF_DIF between the model air mass flow SAF_MDL and the actually measured actual air mass flow SAF_KGH in the secondary-air system is determined in method step S7.

Instead of forming the difference between the successive measurement values MAF_KGH(i−1), MAF_KGH(i), these values may also be put into a ratio and then compared with a threshold value. The same applies to the comparison of the model air mass flow SAF_MDL with the actually measured actual air mass flow SAF_KGH in the secondary-air system. All that is important is the size of the deviation between the respective variables.

Subsequently, in method step S8, a correction value SAF_COR for the secondary-air mass flow is calculated, with the aid of the difference SAF_DIF and the model air mass flow SAF_MDL, according to the following equation:

$$SAF\_COR = SAF\_MDL + SAF\_DIF$$

If, on the other hand, the inquiry in method step S6 has a negative result, that is to say the amount of the difference between successive values for the main-air mass flow MAF_KGH is below the threshold value SW2, then the internal combustion engine is recognized as being in a steady-state mode and, in method step S9, the actually measured value for the secondary-air mass flow SAF_KGH is used as the correction value SAF_COR.

Figure 3:
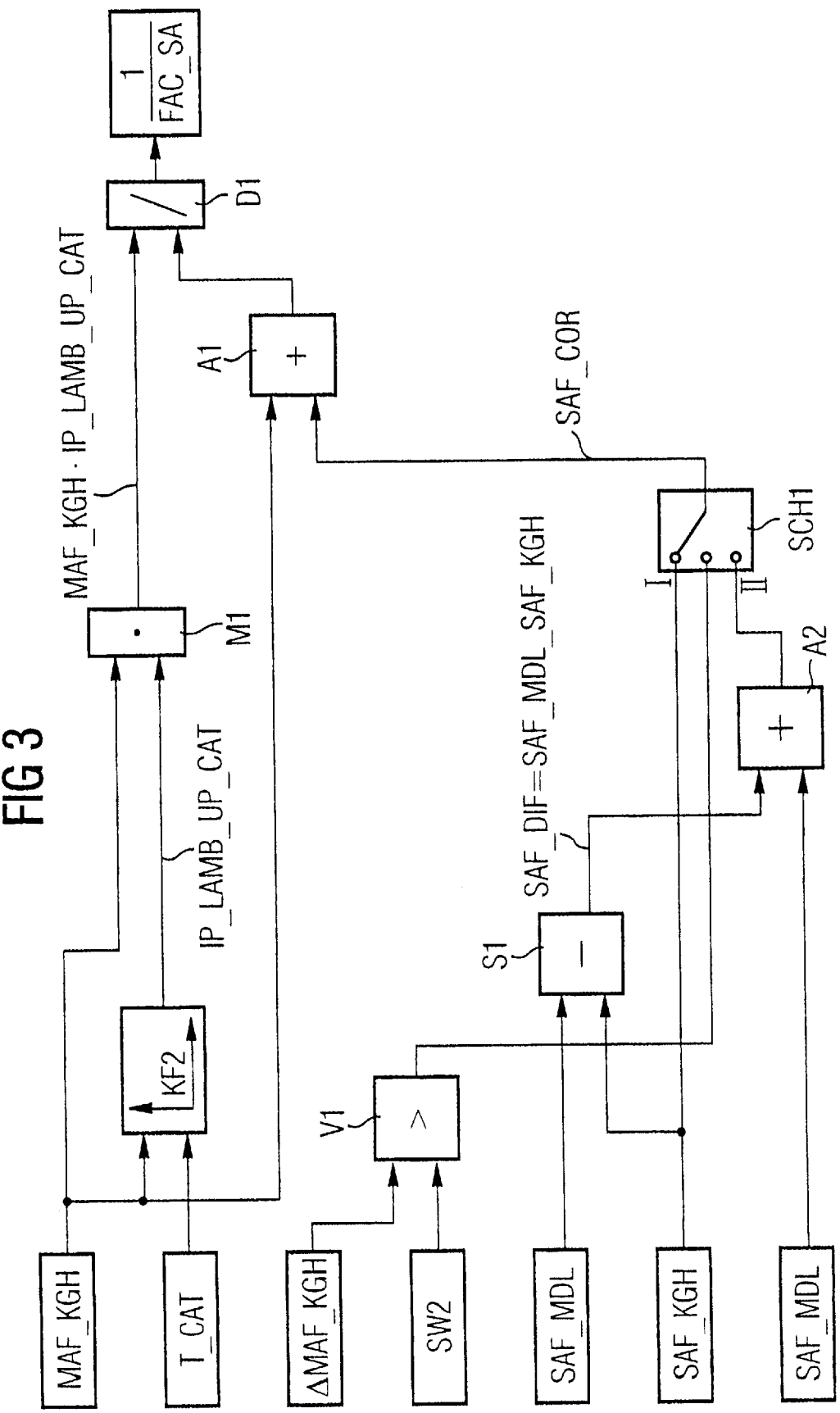
FIG. 3 is a block diagram for determining a correction factor for the injection duration.

A correction factor FAC_SA for the injection duration is calculated from the determined correction value SAF_COR for the secondary-air mass flow in method step S10, as explained in more detail with the description of FIG. 3.

A check is made, in method step S11, as to whether the correction factor FAC_SA is within a range defined by a lower and an upper threshold value. If the correction factor FAC_SA is higher than the upper threshold value or lower than the lower threshold value, it is limited to the respective threshold value in method step S12. The two threshold values are determined by tests on a test bench for a specific internal combustion engine 10 and are stored in the memory 25.

The limitation to a maximum or minimum value prevents the mixture from becoming overly rich or overly lean.

Subsequently, in method step S13, a check is made as to whether the secondary-air function has ended. This is the case, for example, when the temperature of the internal combustion engine 10 or of the exhaust-gas catalyst 19 has exceeded a predetermined value and there is therefore no longer any need for an additional heating measure or another termination condition is satisfied.

If the secondary-air function has not yet ended, there is a branch to method step S3 and the following method steps are executed repeatedly. If one of the termination conditions is satisfied, in method step S14 the secondary-air valve 29 is closed, the secondary-air pump 26 is switched off and the method is at an end.

The procedure for calculating the correction factor FAC_SA for the injection duration is illustrated in the form of a block diagram in FIG. 3. The air mass flow MAF_KGH measured by the airflow sensor 13 in the intake tract 11 of the internal combustion engine 10 and the temperature T_CAT of the catalyst 19, detected by the temperature sensor 20, are input variables of a characteristic map KF2, in which values for a pilot control lambda for catalyst heating are stored as a function of these variables. In a multiplication stage M1, the value IP_LAMB_UP_CAT read out from the characteristic map is multiplied by the value for the main-air mass flow MAF_KGH. The value thus obtained is the input variable of a division stage D1.

The amount of the difference $\Delta MAF\_KGH = MAF\_KGH(i-1) - MAF\_KGH(i)$ between two successive measurement values for the main-air mass flow is supplied to a comparator stage V1 which compares this value with a stored threshold value SW2. The output of the comparator V1 activates a changeover switch SCH1 depending on the result of the comparison.

If the amount of the difference $\Delta MAF\_KGH$ is lower than the predetermined threshold value SW2, the changeover switch SCH1 is in a position designated by I. Since the internal combustion engine is not in a transient mode, the value SAF_KGH present at the output of the changeover switch SCH1 and detected by the airflow sensor 30 serves as the correction value SAF_COR for calculating the correction factor for the injection duration. The correction value SAF_COR is supplied to an addition stage A1, the other input of which the main-air mass flow MAF_KGH is applied. The result of the summation is supplied to the division stage D1. For the steady-state mode, therefore, a value $$LAM\_CH = 1/FAC\_SA = \frac{(MAF\ KGH \cdot IP\ LAMB\ UP\ CAT\ SA)}{(MAF\_KGH + SAF\_KGH)}$$

is obtained at the output of the division state D1.

If the amount of the difference ΔMAF_KGH is higher than the predetermined threshold value SW2, then the internal combustion engine is in the transient state (a load jump has been detected) and the changeover switch SCH1 is in a position designated by II.

In this case, the measured value SAF_KGH actually present is not switched through as the correction value SAF_COR to the input of the addition stage A1 by the changeover switch SCH1, but, instead, further correction takes place, in which the deviation between the model air mass flow and the measured secondary-air mass flow is taken into account.

The desired secondary-air mass flow (model air mass flow) SAF_MDL determined from the model and the measured value actually present for the secondary-air mass flow SAF_KGH are supplied to a subtraction stage S1 and the difference SAF_DIF=SAF_MDL–SAF_KGH is formed there. The difference SAF_DIF is the input variable of a second addition stage A2, at the further input of which the model air mass flow SAF_MDL is applied. The correction value SAF_COR=SAF_MDL+SAF_DIF is present at the output of the addition stage A2 and is led via the changeover switch SCH1 to the input of the first addition stage A1. The other input variable of the addition stage A1 and that of the division stage D1 are the same as already specified in the description for the steady-state mode of the internal combustion engine.

A value $$LAM\_CH = 1/FAC\_SA = \frac{(MAF\ KGH \cdot IP\ LAMB\ UP\ CAT\ SA)}{(MAF\_KGH + SAF\_MDL + SAF\_DIF)}$$

is thus obtained for the case of the transient mode at the output of the division stage D1.

The respective correction factor FAC_SA is incorporated in a general formula, known per se, for calculating the injection duration, as a factor which takes into account catalyst heating through blowing in secondary air.

We claim:

1. A method for injection duration correction in an internal combustion engine, which comprises:

blowing secondary air into an exhaust tract upstream of a catalyst via a secondary-air system during a warm-up phase of an internal combustion engine;

detecting a main-air mass flow present in an intake tract of the internal combustion engine and a secondary-air mass flow provided by the secondary-air system;

carrying out an injection duration correction in dependence on the main-air mass flow, the secondary-air mass flow and a pilot control value for an air/fuel ratio;

deducing a presence of a transient mode of the internal combustion engine from values of the main-air mass flow;

correcting the secondary-air mass flow in the transient mode of the internal combustion engine, and calculating a deviation between a desired value, determined from a model for the secondary-air mass flow, and a detected actual value of the secondary-air mass flow; and determining a correction factor for the injection duration correction from a correction value for the secondary-air mass flow, the main-air mass flow and the pilot control value for the air/fuel ratio.

2. The method according to claim 1, which comprises forming the correction value from a sum of a difference between the desired value for the secondary-air mass flow and the detected actual value of the secondary-air mass flow as well as from the desired value for the secondary-air mass flow.

3. The method according to claim 2, which comprises calculating the correction factor from the correction value according to the equations:

FAC_SA=(MAF_KGH+SAF_COR)/(MAF_KGH·IP_LAMB_UP_CAT_SA)

SAF_COR=SAF_DIF+SAF_MDL;

where FAC_SA is the correction factor,

MAF_KGH is the main-air mass flow,

SAF_COR is the correction value,

IP_LAMB_UP_CAT_SA is the pilot control value for the air/fuel ratio,

SAF_DIF is the difference between the desired value for the secondary-air mass flow and the detected actual value of the secondary-air mass flow, and SAF_MDL is the desired value for the secondary-air mass flow.

4. The method according to claim 1, which comprises storing the desired value for the secondary-air mass flow in a characteristic map of a memory of a control device serving for controlling the internal combustion engine in dependence on at least one of the variables selected from the group consisting of a supply voltage of a secondary-air pump, an exhaust gas back pressure, an ambient pressure, an ambient temperature, and the main-air mass flow.

5. The method according to claim 1, which comprises checking if the correction factor is within a range limited by a lower threshold value and an upper threshold value and, if the correction factor does not fall within the range it is limited to one of the lower threshold value and the upper threshold value.

6. The method according to claim 1, which comprises recognizing that the internal combustion engine is in the transient mode if an amount of a difference between two successive measurement values of the main-air mass flow is higher than a predetermined threshold value.

* * * * *